United States Patent
Noda et al.

(10) Patent No.: US 7,169,511 B2
(45) Date of Patent: Jan. 30, 2007

(54) NONAQUEOUS ELECTROLYTE SOLUTION AND NONAQUEOUS ELECTROLYTE SOLUTION SECONDARY BATTERY EMPLOYING THE SAME

(75) Inventors: Daisuke Noda, Mie (JP); Masamichi Oonuki, Ibaraki (JP); Kunihisa Shima, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 10/855,489

(22) Filed: May 28, 2004

(65) Prior Publication Data

US 2005/0014071 A1 Jan. 20, 2005

Related U.S. Application Data

(63) Continuation of application No. PCT/JP03/13432, filed on Oct. 21, 2003.

(30) Foreign Application Priority Data

| Oct. 22, 2002 | (JP) | ............................ P.2002-306901 |
| Dec. 24, 2002 | (JP) | ............................ P.2002-372323 |
| May 14, 2003  | (JP) | ............................ P.2003-136322 |

(51) Int. Cl.
*H01M 6/16* (2006.01)

(52) U.S. Cl. ....................... 429/326; 429/330; 429/332; 429/231.1; 429/231.8; 429/231.4

(58) Field of Classification Search ................ 429/326, 429/199, 330, 231.1, 332, 231.8, 231.4
See application file for complete search history.

(56) References Cited

U.S. PATENT DOCUMENTS 6,210,840 B1 4/2001 Usami et al.

FOREIGN PATENT DOCUMENTS

| EP | 825664 A1 | 2/1998 |
| JP | 7-153487 | 6/1995 |
| JP | 10-223257 | 3/1998 |
| JP | 10-228928 | 8/1998 |
| JP | 11-233140 | 8/1999 |
| JP | 11-233141 | 8/1999 |
| JP | 2000-36332 | 2/2000 |
| JP | 2000-215911 | * 8/2000 |
| JP | 2000-228216 | 8/2000 |
| JP | 2001-85056 | 3/2001 |
| JP | 2002-198090 | 7/2002 |
| JP | 2002-319431 | 10/2002 |

* cited by examiner

*Primary Examiner*—Laura Weiner
(74) *Attorney, Agent, or Firm*—Oblon, Spivak, McClelland, Maier & Neustadt, P.C.

(57) ABSTRACT

A subject for the invention is to provide an electrolyte solution and a secondary battery which are prevented from causing or suffering battery performance deterioration in high-temperature storage or high-temperature trickle charge.

The invention relates to a nonaqueous electrolyte solution for a secondary battery which comprises solute, phosphinic ester compound, and nonaqueous organic solvent containing these, characterized in that the content of the phosphinic ester compound has been regulated to a specific amount based on the total weight of the nonaqueous electrolyte solution.

12 Claims, No Drawings

NONAQUEOUS ELECTROLYTE SOLUTION AND NONAQUEOUS ELECTROLYTE SOLUTION SECONDARY BATTERY EMPLOYING THE SAME

This application is a continuation of international application PCT/JP03/13432, filed Oct. 21, 2003.

FIELD OF THE INVENTION

The present invention relates to a nonaqueous electrolyte solution for a secondary battery and a nonaqueous-electrolyte secondary battery employing the same. More particularly, the invention relates to a nonaqueous-electrolyte secondary battery which has high reliability and is prevented from deteriorating even in high-temperature trickle charge and high-temperature storage, and to a nonaqueous electrolyte solution for a secondary battery which is for use in providing the secondary battery.

BACKGROUND ART

As a result of the trend toward weight reduction and size reduction in electrical appliances, attention is recently focused on a lithium secondary battery, which has a high energy density.

An electrolyte solution for a lithium secondary battery comprises a solute such as a lithium salt and an organic solvent. The organic solvent is required to have a high permittivity and a high oxidation potential and be stable in a battery. Since it is difficult for a single solvent to satisfy these requirements, a combination of a high-permittivity solvent such as, for example, a cyclic carbonic ester, e.g., ethylene carbonate or propylene carbonate, a cyclic carboxylic ester, e.g., γ-butyrolactone, or the like and a low-viscosity solvent such as a chain carbonic ester, e.g., diethyl carbonate or dimethyl carbonate, an ether, e.g., dimethoxyethane, or the like is used as the organic solvent of electrolyte solutions for a lithium secondary battery.

On the other hand, a lithium secondary battery is desired to be improved in various properties, and it has been proposed to contain various compounds in the electrolyte solution in order to meet the desire. Various phosphorus compounds have been investigated as such compounds to be contained in an electrolyte solution.

For example, to contain a phosphoric ester in an electrolyte solution is described in patent document 1 as a technique for improving suitability for trickle charge.

Furthermore, patent document 2 and patent document 3 describe a technique in which a specific phosphonic ester or phosphinic ester is contained into an organic solvent in an amount of from 5to 100% by weight to thereby impart fire retardancy to the electrolyte solution without adversely influencing battery performances. It is demonstrated in examples therein that in a secondary battery employing an electrolyte solution obtained by dissolving $LiPF_6$ in an organic solvent prepared by mixing a carbonic ester or chain ether with those phosphoric esters in a weight ratio of 2:1 or 1:1, the decrease in capacity retention as measured at the 100th cycle is as small as from several percents to ten-odd percents. However, there is no statement therein concerning high-temperature characteristics of the battery.

Moreover, patent document 4 describes a photoregeneration type photoelectrochemical battery in which an ester such as phosphoric ester, an organic phosphonic ester, or an organic phosphinic ester is used, in place of carbonic ester or ether heretofore in use, as the solvent constituting the electrolyte solution to thereby prevent photo-electric converting characteristics from deteriorating with the lapse of time. There also is a statement to the effect that this electrolyte solution is applicable to a lithium-ion secondary battery. However, in this patent document 3 also, there is no statement concerning high-temperature characteristics of the secondary battery.

[Patent Document 1]
JP-A-11-233140

[Patent Document 2]
JP-A-10-228928

[Patent Document 3]
JP-A-11-233141

[Patent Document 4]
JP-A-2000-36332

DISCLOSURE OF THE INVENTION

With the rapid spread of lithium secondary battery in the portable appliances such as a portable personal computer and a cellular phone, there is a growing demand for higher performances. In particular, improvements in high-temperature battery characteristics such as suitability for high-temperature trickle charge and high-temperature storability are required.

For example, portable personal computers, in most cases, are used in the state of being connected to a power source through an AC adapter, and the secondary battery in the personal computers in use is being constantly charged. These batteries have a problem that because of such a state of being continuously charged and due to the heat generation in the computers, the electrolyte solution suffers decomposition to considerably reduce battery performances. There also is a problem that although the decomposition of an electrolyte solution is accompanied by gas evolution in many cases, gas evolution in too large an amount results in battery deformation or burst and makes the battery itself unusable.

Furthermore, there are cases where those portable appliances are left in a high-temperature atmosphere, e.g., in an automobile in the daytime. In this case also, the secondary battery is exposed to high temperatures. There is hence a problem that the decomposition of the electrolyte solution occurs to reduce battery characteristics and gas evolution causes battery can deformation/burst.

Accordingly, an object of the invention is to provide electrolyte solutions prevented from decomposing during high-temperature trickle charge or high-temperature storage and a secondary battery which employs the electrolyte solution and has excellent high-temperature characteristics.

The present inventors made intensive investigations in order to overcome the problems described above. As a result, it has been found that suitability for high-temperature trickle charge and high-temperature storability are greatly improved by containing phosphinic ester in a nonaqueous electrolyte solution in a specific concentration. The invention has been thus completed.

Namely, an essential point of the invention resides in a nonaqueous electrolyte solution for a secondary battery which comprises solute, phosphinic ester, and nonaqueous organic solvent containing these, characterized in that the content of the phosphinic ester compound is from 0.01% by weight to 4.5% by weight based on the total weight of the nonaqueous electrolyte solution.

Examples of the phosphinic ester compound include phosphinic ester compounds represented by the following formula (1) and (2):

(1)

(wherein $R_1$ to $R_3$ each independently represents one member selected from the group consisting of (i) a chain or cyclic alkyl group which has 1 to 8 carbon atoms and may be substituted with one or more halogen atoms, (ii) a phenyl group which may be substituted with one or more halogen atoms, (iii) a phenyl group which may be substituted with one or more alkyl groups having 1 to 4 carbon atoms, and (iv) a phenyl group which may be substituted with one or more halogen atoms and one or more alkyl groups having 1 to 4 carbon atoms, provided that when the pair of $R_1$ and $R_2$ or the pair of $R_2$ and $R_3$ is alkyl groups, then the groups may be bonded to each other to form a ring structure);

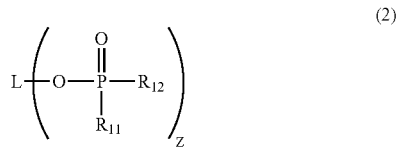
(2)

(wherein $R_{11}$ and $R_{12}$ each independently represents a chain or cyclic alkyl group which has 1 to 8 carbon atoms and may be substituted with one or more halogen atoms or a phenyl group which may be substituted with one or more halogen atoms, provided that when $R_{11}$ and $R_{12}$ each are an alkyl group, they may be bonded to each other to form a ring structure; L represents a connecting group having a valence of z and constituted of one or more atoms selected from the group consisting of a carbon atom, a hydrogen atom, and an oxygen atom; and z represents an integer of 2 to 8).

Another essential point of the invention resides in a nonaqueous-electrolyte secondary battery characterized by comprising a negative electrode capable of absorbing/releasing lithium, a positive electrode capable of absorbing/releasing lithium, and the nonaqueous electrolyte solution for a secondary battery.

BEST MODE FOR CARRYING OUT THE INVENTION

The invention will be explained below in detail.

The main components of the nonaqueous electrolyte solution for a secondary battery according to the invention are solute and nonaqueous organic solvent in which the solute is dissolved, as in ordinary nonaqueous electrolyte solutions for a secondary battery.

As the solute is used a lithium salt. The lithium salt is not particularly limited as long as it is usable for this application. Examples thereof include the following.
1) Inorganic lithium salts: fluorine containing inorganic salts such as $LiAsF_6$, $LiPF_6$, and $LiBF_4$ and perhalogenate salts such as $LiClO4$, $LiBrO_4$, and $LiIO_4$.
2) Organic lithium salts: organic lithium borate salts such as $LiB(C_6H_5)_4$, alkanesulfonate salts such as $LiCH_3SO_3$, perfluoroalkanesulfonimide salts such as $LiN(SO_2CF_3)_2$ and $LiN(SO_2C_2F_5)_2$, and perfluoroalkanesulfonate salts such as $LiCF_3SO_3$.

Preferred of these are $LiBF_4$ and $LiPF_6$. Lithium salts may be used alone or as a mixture of two or more thereof.

The concentration of the lithium salt in the nonaqueous electrolyte solution is generally 0.5 mol/L or higher, preferably 0.75 mol/L or higher, and is generally 2.5 mol/L or lower, preferably 1.5 mol/L or lower. Too high or too low concentrations of the lithium salt result in a decrease in conductivity and this may reduce battery characteristics.

The nonaqueous organic solvent to be used also can be suitably selected from ones which have been proposed as solvents for nonaqueous electrolyte solutions. Examples thereof include cyclic carbonates (cyclic carbonic esters), chain carbonates (chain carbonic esters), cyclic esters (cyclic carboxylic esters), chain esters (chain carboxylic esters), cyclic ethers, chain ethers, and the like.

The nonaqueous organic solvent in the electrolyte solution preferably is a mixed solvent comprising a cyclic carbonate and a member selected from the group consisting of chain carbonates and cyclic esters.

In the case where a cyclic carbonate is contained in the nonaqueous organic solvent in the electrolyte solution, the proportion thereof is preferably from 5% by volume to 55% by volume, more preferably from 15% by volume to 50% by volume.

In the case where a chain carbonate is contained in the nonaqueous organic solvent in the electrolyte solution, the proportion thereof is preferably from 2% by volume to 85% by volume, more preferably from 5% by volume to 85% by volume.

Furthermore, in the case where a cyclic ester is contained in the nonaqueous organic solvent in the electrolyte solution, the proportion thereof is preferably from 40% by volume to 100% by volume, more preferably from 50% by volume to 98% by volume.

Examples of preferred combinations of organic solvents and volume proportions thereof include the following.
1. Cyclic carbonate/chain carbonate: (15–40)/(60–85)
2. Cyclic carbonate/cyclic ester: (20–50)/(50–80)
3. Cyclic carbonate/cyclic ester/chain carbonate: (20–50)/(50–80)/(2–20)
4. Cyclic ester/chain carbonate: (70–98)/(2–30)
5. Cyclic ester (single solvent)

Examples of the cyclic carbonates include ethylene carbonate, propylene carbonate, butylene carbonate, and the like. Examples of the chain carbonates include dimethyl carbonate, diethyl carbonate, ethyl methyl carbonate, and the like. Examples of the cyclic ethers include tetrahydrofuran, 2-methyltetrahydrofuran, tetrahydropyran, and the like. Examples of the chain ethers include dimethoxyethane, diethoxyethane, and the like. Examples of the cyclic esters include γ-butyrolactone, γ-valerolactone, and the like. Examples of the chain esters include methyl acetate, methyl propionate, and the like.

Those nonaqueous organic solvents may be used alone or as a mixture of two or more thereof. Usually, however, a mixture of two or more thereof is used so as to have appropriate properties. Examples thereof include solvents prepared by mixing two or more members selected from cyclic carbonates, chain carbonates, and cyclic esters. Especially preferred is one prepared by mixing two or more members selected from ethylene carbonate, propylene carbonate, dimethyl carbonate, diethyl carbonate, ethyl methyl carbonate, γ-butyrolactone, and the like.

Although the nonaqueous electrolyte solution according to the invention contains the solute and nonaqueous organic solvent described above as the main components, it further contains a phosphinic ester compound.

Examples of the phosphinic ester compound include ones selected from the group consisting of compounds represented by the following formula (1) and following formula (2). (Hereinafter, compounds represented by the following formula (2), which have two or more phosphinic ester structures, are sometimes referred to as "polyvalent phosphinates".)

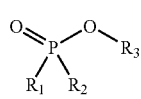

(1)

In the formula, $R_1$ to $R_3$ each independently represents one member selected from the group consisting of (i) a chain or cyclic alkyl group which has 1 to 8 carbon atoms and may be substituted with one or more halogen atoms, (ii) a phenyl group which may be substituted with one or more halogen atoms, (iii) a phenyl group which may be substituted with one or more alkyl groups having 1 to 4 carbon atoms, and (iv) a phenyl group which may be substituted with one or more halogen atoms and one or more alkyl groups having 1 to 4 carbon atoms. Especially preferably, $R_1$ to $R_3$ each independently represent one member selected from the group consisting of (i) a chain alkyl group which has 1 to 8 carbon atoms and may be substituted with one or more halogen atoms, (ii) a phenyl group which may be substituted with one or more halogen atoms, (iii) a phenyl group which may be substituted with one or more alkyl groups having 1 to 4 carbon atoms, and (iv) a phenyl group which may be substituted with one or more halogen atoms and one or more alkyl groups having 1 to 4 carbon atoms.

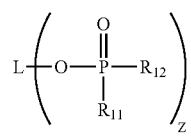

(2)

In the formula, $R_{11}$ and $R_{12}$ each independently represents a chain or cyclic alkyl group which has 1 to 8 carbon atoms and may be substituted with one or more halogen atoms or a phenyl group which may be substituted with one or more halogen atoms. Especially preferably, $R_{11}$ and $R_{12}$ each independently is a chain alkyl group having 1 to 8 carbon atoms. Although $R_1$ and $R_2$ may be different, they preferably are the same group.

First, the phosphinic ester compounds represented by formula (1) will be explained.

Examples of some of the substituents represented by $R_1$ to $R_3$ are shown.

Examples of the chain alkyl group which maybe substituted with one or more halogen atoms include methyl, ethyl, n-propyl, isopropyl, n-butyl, isobutyl, sec-butyl, tert-butyl, n-pentyl, 2-methylbutyl, 3-methylbutyl, 4-methylbutyl, 2,2-dimethylpropyl, 2,3-dimethylpropyl, 3,3-dimethylpropyl, n-hexyl, n-heptyl, n-octyl, 2-ethylhexyl, trifluoromethyl, 2,2,2-trifluoroethyl, pentafluoroethyl, and the like. Preferred of these are chain alkyl groups which have 1 to 4 carbon atoms and may be substituted with one or more halogen atoms, such as methyl, ethyl, n-propyl, isopropyl, n-butyl, isobutyl, sec-butyl, tert-butyl, trifluoromethyl, 2,2,2-trifluoroethyl, and pentafluoroethyl. More preferred are such alkyl groups having 1 to 3 carbon atoms.

Examples of the cyclic alkyl group which may be substituted with one or more halogen atoms include ones having 4 to 6 carbon atoms, preferably 5 or 6 carbon atoms, such as cyclopentyl, cyclohexyl, 2-fluorocyclohexyl, 3-fluorocyclohexyl, and 4-fluorocyclohexyl.

Examples of the phenyl group which may be substituted with one or more halogen atoms, the phenyl group which may be substituted with one or more alkyl groups having 1 to 4 carbon atoms, and the phenyl group which may be substituted with one or more halogen atoms and one or more alkyl groups having 1 to 4 carbon atoms include phenyl, 2-fluorophenyl, 3-fluorophenyl, 4-fluorophenyl, 2-tolyl, 3-tolyl, 4-tolyl, 2,3-difluorophenyl, 2,4-difluorophenyl, 2,5-difluorophenyl, 2,6-difluorophenyl, 3,4-difluorophenyl, 3,5-difluorophenyl, 4,5-difluorophenyl, 2-fluoro-3-tolyl, 2-fluoro-4-tolyl, 2-fluoro-5-tolyl, 2-fluoro-6-tolyl, 3-fluoro-2-tolyl, 3-fluoro-4-tolyl, 3-fluoro-5-tolyl, 3-fluoro-6-tolyl, 4-fluoro-2-tolyl, 4-fluoro-3-tolyl, and the like. More preferred alkyl-substituted phenyl groups are ones in which each substituent alkyl group has 1 or 2 carbon atoms. Preferred of these are phenyl, 2-tolyl, 3-tolyl, and 4-tolyl.

Although the halogen atoms with which the alkyl and phenyl groups may be substituted preferably are fluorine atoms as shown above, they may be chlorine atoms, bromine atoms, iodine atoms, etc.

When the pair of $R_1$ and $R_2$ or the pair of $R_2$ and $R_3$ is alkyl groups, these groups may be bonded to each other to form a ring structure. Examples thereof include: the case in which $R_1$ and $R_2$ are bonded to each other to form a 5- or 6-membered ring containing the phosphorus atom, i.e., the case in which the phosphorus atom is bonded to the 1-position and 4-position in an n-butylene group or to the 1-position and 5-position in an n-pentylene group to form a ring; the case in which $R_2$ and $R_3$ are bonded to each other to form a 5- or 6-membered ring containing the phosphorus atom and oxygen atom; and the like.

Specific examples of the compounds represented by formula (1) include the following.

Methyl dialkylphosphinates: Examples include methyl dimethylphosphinate, methyl ethylmethylphosphinate, methyl methyl-n-propylphosphinate, methyl n-butylmethylphosphinate, methyl diethylphosphinate, methyl ethyl-n-propylphosphinate, methyl n-butylethylphosphinate, methyl di-n-propylphosphinate, methyl n-butyl-n-propylphosphinate, methyl di-n-butylphosphinate, methyl bis(trifluoromethyl)phosphinate, trifluoromethyl bis(trifluoromethyl)phosphinate, methyl bis(2,2,2-trifluoroethyl)phosphinate, trifluoromethyl bis(2,2,2-trifluoroethyl)phosphinate, methyl bis(pentafluoroethyl)phosphinate, trifluoromethyl bis(pentafluoroethyl)phosphinate, and the like.

Ethyl dialkylphosphinates: Examples include ethyl dimethylphosphinate, ethyl ethylmethylphosphinate, ethyl methyl-n-propylphosphinate, ethyl n-butylmethylphosphinate, ethyl diethylphosphinate, ethyl ethyl-n-propylphosphinate, ethyl n-butylethylphosphinate, ethyl di-n-propylphosphinate, ethyl n-butyl-n-propylphosphinate, ethyl di-n-butylphosphinate, ethyl bis(trifluoromethyl)phosphinate, 2,2,2-trifluoroethyl bis(trifluoromethyl)phosphinate, pentafluoroethyl bis(trifluoromethyl)phosphinate, ethyl bis(2,2,2-trifluoroethyl)phosphinate, 2,2,2-trifluoroethyl bis(2,2,2-trifluoroethyl)phosphinate, pentafluoroethyl bis(2,2,2-trifluoroethyl)phosphinate, ethyl bis(pentafluoroethyl)

phosphinate, 2,2,2-trifluoroethyl bis(pentafluoroethyl) phosphinate, and pentafluoroethyl bis(pentafluoroethyl) phosphinate.

Propyl dialkylphosphinates: Examples include n-propyl dimethylphosphinate, n-propyl ethylmethylphosphinate, n-propyl methyl-n-propylphosphinate, n-propyl n-butylmethylphosphinate, n-propyl diethylphosphinate, n-propyl ethyl-n-propylphosphinate, n-propyl n-butylethylphosphinate, n-propyl di-n-propylphosphinate, n-propyl n-butyl-n-propylphosphinate, n-propyl di-n-butylphosphinate, and the like.

Butyl dialkylphosphinates: Examples include n-butyl dimethylphosphinate, n-butyl ethylmethylphosphinate, n-butyl methyl-n-propylphosphinate, n-butyl n-butylmethylphosphinate, n-butyl diethylphosphinate, n-butyl ethyl-n-propylphosphinate, n-butyl n-butylethylphosphinate, n-butyl di-n-propylphosphinate, n-butyl n-butyl-n-propylphosphinate, n-butyl di-n-butylphosphinate, and the like.

Alkyl diarylphosphinates: Examples include methyl diphenylphosphinate, ethyl diphenylphosphinate, n-propyl diphenylphosphinate, n-butyl diphenylphosphinate, methyl bis(2-tolyl)phosphinate, ethyl bis(2-tolyl)phosphinate, n-propyl bis(2-tolyl)phosphinate, n-butyl bis(2-tolyl)phosphinate, methyl bis(3-tolyl)phosphinate, ethyl bis(3-tolyl) phosphinate, n-propyl bis(3-tolyl)phosphinate, n-butyl bis (3-tolyl)phosphinate, methyl bis(4-tolyl)phosphinate, ethyl bis(4-tolyl)phosphinate, n-propyl bis(4-tolyl)phosphinate, n-butyl bis(4-tolyl)phosphinate, and the like.

Alkyl alkylarylphosphinates: Examples include methyl methylphenylphosphinate, methyl ethylphenylphosphinate, methyl n-propylphenylphosphinate, methyl n-butylphenylphosphinate, ethyl methylphenylphosphinate, ethyl ethylphenylphosphinate, ethyl n-propylphenylphosphinate, ethyl n-butylphenylphosphinate, n-propyl methylphenylphosphinate, n-propyl ethylphenylphosphinate, n-propyl n-propylphenylphosphinate, n-propyl n-butylphenylphosphinate, n-butyl methylphenylphosphinate, n-butyl ethylphenylphosphinate, n-butyl n-propylphenylphosphinate, n-butyl n-butylphenylphosphinate, methyl methyl-2-tolylphosphinate, methyl ethyl-2-tolylphosphinate, methyl n-propyl-2-tolylphosphinate, methyl n-butyl-2-tolylphosphinate, ethyl methyl-2-tolylphosphinate, ethyl ethyl-2-tolylphosphinate, ethyl n-propyl-2-tolylphosphinate, ethyl n-butyl-2-tolylphosphinate, n-propyl methyl-2-tolylphosphinate, n-propyl ethyl-2-tolylphosphinate, n-propyl n-propyl-2-tolylphosphinate, n-propyl n-butyl-2-tolylphosphinate, n-butyl methyl-2-tolylphosphinate, n-butyl ethyl-2-tolylphosphinate, n-butyl n-propyl-2-tolylphosphinate, n-butyl n-butyl-2-tolylphosphinate, methyl methyl-3-tolylphosphinate, methyl ethyl-3-tolylphosphinate, methyl n-propyl-3-tolylphosphinate, methyl n-butyl-3-tolylphosphinate, ethyl methyl-3-tolylphosphinate, ethyl ethyl-3-tolylphosphinate, ethyl n-propyl-3-tolylphosphinate, ethyl n-butyl-3-tolylphosphinate, n-propyl methyl-3-tolylphosphinate, n-propyl ethyl-3-tolylphosphinate, n-propyl n-propyl-3-tolylphosphinate, n-propyl n-butyl-3-tolylphosphinate, n-butyl methyl-3-tolylphosphinate, n-butyl ethyl-3-tolylphosphinate, n-butyl n-propyl-3-tolylphosphlnate, n-butyl n-butyl-3-tolylphosphinate, methyl methyl-4-tolylphosphinate, methyl ethyl-4-tolylphosphinate, methyl n-propyl-4-tolylphosphinate, methyl n-butyl-4-tolylphosphinate, ethyl methyl-4-tolylphosphinate, ethyl ethyl-4-tolylphosphinate, ethyl n-propyl-4-tolylphosphinate, ethyl n-butyl-4-tolylphosphinate, n-propyl methyl-4-tolylphosphinate, n-propyl ethyl-4-tolylphosphinate, n-propyl n-propyl-4-tolylphosphinate, n-propyl n-butyl-4-tolylphosphinate, n-butyl methyl-4-tolylphosphinate, n-butyl ethyl-4-tolylphosphinate, n-butyl n-propyl-4-tolylphosphinate, n-butyl n-butyl-4-tolylphosphinate, and the like.

Aryl dialkylphosphinates: Examples include phenyl dimethylphosphinate, phenyl ethylmethylphosphinate, phenyl diethylphosphinate, phenyl methyl-n-propylphosphinate, phenyl methyl-n-butylphosphinate, phenyl ethyl-n-propylphosphinate, phenyl ethyl-n-butylphosphinate, phenyl di-n-propylphosphinate, phenyl n-butyl-n-propylphosphinate, phenyl di-n-butylphosphinate, 2-tolyl dimethylphosphinate, 2-tolyl ethylmethylphosphinate, 2-tolyl diethylphosphinate, 2-tolyl methyl-n-propylphosphinate, 2-tolyl methyl-n-butylphosphinate, 2-tolyl ethyl-n-propylphosphinate, 2-tolyl ethyl-n-butylphosphinate, 2-tolyl di-n-propylphosphinate, 2-tolyl n-butyl-n-propylphosphinate, 2-tolyl di-n-butylphosphinate, 3-tolyl dimethylphosphinate, 3-tolyl ethylmethylphosphinate, 3-tolyl diethylphosphinate, 3-tolyl methyl-n-propylphosphinate, 3-tolyl methyl-n-butylphosphinate, 3-tolyl ethyl-n-propylphosphinate, 3-tolyl ethyl-n-butylphosphinate, 3-tolyl di-n-propylphosphinate, 3-tolyl n-butyl-n-propylphosphinate, 3-tolyl di-n-butylphosphinate, 4-tolyl dimethylphosphinate, 4-tolyl ethylmethylphosphinate, 4-tolyl diethylphosphinate, 4-tolyl methyl-n-propylphosphinate, 4-tolyl methyl-n-butylphosphinate, 4-tolyl ethyl-n-propylphosphinate, 4-tolyl ethyl-n-butylphosphinate, 4-tolyl di-n-propylphosphinate, 4-tolyl n-butyl-n-propylphosphinate, 4-tolyl di-n-butylphosphinate, and the like.

Next, the phosphinic ester compounds represented by formula (2) will be explained.

Examples of the chain alkyl groups represented by $R_{11}$ and $R_{12}$, which have 1 to 8 carbon atoms and may be substituted with one or more halogen atoms, include methyl, ethyl, n-propyl, isopropyl, n-butyl, isobutyl, sec-butyl, tert-butyl, n-pentyl, 2-methylbutyl, 3-methylbutyl, 2,2-dimethylpropyl, n-hexyl, n-heptyl, n-octyl, 2-ethylhexyl, trifluoromethyl, 2,2,2-trifluoroethyl, pentafluoroethyl, and the like. Preferred of these are chain alkyl groups which have 1 to 4 carbon atoms and may be substituted with one or more halogen atoms, such as methyl, ethyl, n-propyl, isopropyl, n-butyl, isobutyl, sec-butyl, tert-butyl, trifluoromethyl, 2,2, 2-trifluoroethyl, and pentafluoroethyl. More preferred are such alkyl groups having 1 or 2 carbon atoms.

Examples of the phenyl group which may be substituted with one or more halogen atoms include phenyl, 2-fluorophenyl, 3-fluorophenyl, 4-fluorophenyl, and the like.

Examples of the cyclic alkyl group which maybe substituted with one or more halogen atoms include ones having 4 to 6 carbon atoms, preferably having 5or 6carbon atoms, such as cyclopentyl, cyclohexyl, 2-fluorocyclohexyl, 3-fluorocyclohexyl, and 4-fluorocyclohexyl.

Although the halogen atoms with which the alkyl and phenyl groups may be substituted preferably are fluorine atoms as shown above, they may be chlorine atoms, bromine atoms, iodine atoms, etc.

When $R_{11}$ and $R_{12}$ each is an alkyl group, they may be bonded to each other to form a ring structure. Examples thereof include the case in which $R_{11}$ and $R_{12}$ are bonded to each other to form a 5- or 6-membered ring containing the phosphorus atom, i.e., the case in which the phosphorus atom is bonded to the 1-position and 4-position in an n-butylene group or to the 1-position and 5-position in an n-pentylene group to form a ring, and the like.

Symbol Z is an integer of 2 to 8, preferably an integer of 2 to 4.

Whether this phosphinic ester compound acts on the positive electrode or on the negative electrode has not been elucidated. It is, however, thought that the compound reacts with and is adsorbed onto an electrode to thereby produce its effects. Consequently, a phosphinic ester compound having a larger number of phosphinic ester groups in the molecule is expected to be adsorbed more tenaciously. It is hence thought that the larger the Z, the more the effects of the addition of the compound are enhanced. However, since phosphinic ester compounds in which z is too large are difficult to dissolve in the electrolyte solution, z is selected while taking account of solubility.

Furthermore, L is a connecting group having a valence of z and constituted of one or more atoms selected from the group consisting of a carbon atom, a hydrogen atom, and an oxygen atom. Examples thereof include hydrocarbon groups, —C(=O)—, $R_{14}$—O—$R_{14}'$ ($R_{14}$ and $R_{14}'$ are hydrocarbon groups having a valence of from 2 to Z, provided that the sum of the valence of $R_{14}$ and that of $R_{14}'$ is z+2.), —$R_{15}$—C(=O)—O— ($R_{15}$ represents a bivalent hydrocarbon group.), $R_{16}$—O—C(=O)—O—$R_{16}'$ ($R_{16}$ and $R_{16}'$ are hydrocarbon groups having a valence of from 2 to Z, provided that the sum of the valence of $R_{16}$ and that of $R_{16}'$ is z+2.), and the like. Preferred are hydrocarbon groups. More preferred are saturated hydrocarbon groups. Especially preferred are chain hydrocarbon connecting groups. The number of carbon atoms in L is generally from 2 to 12, preferably from 2 to 8.

When z is 2, specific examples of the hydrocarbon group, i.e., bivalent hydrocarbon group, include the following.

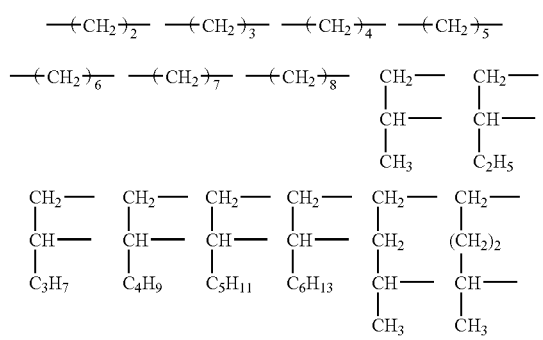

When z is 3, specific examples of the hydrocarbon group, i.e., trivalent hydrocarbon group, include the following.

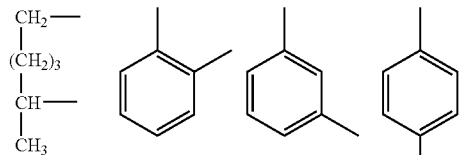

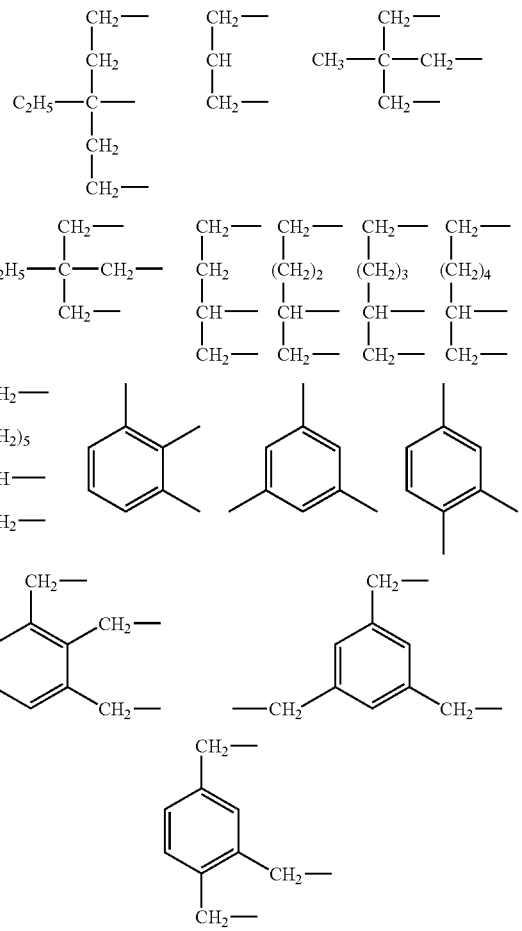

Furthermore, when z is 4, specific examples of the hydrocarbon group, i.e., tetravalent hydrocarbon group, include the following.

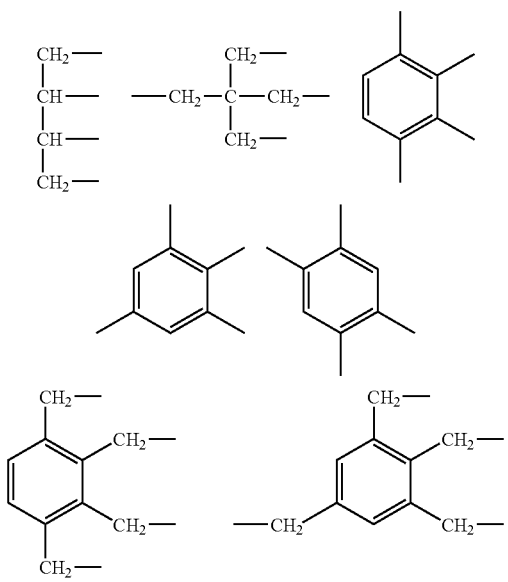

-continued

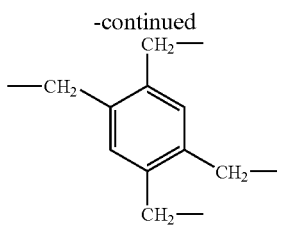

Specific examples of the compounds represented by formula (2), which have two or more phosphinic ester structures, include the following.

(1) Bivalent Phosphinate Compounds 1,2-Ethanediol bisphosphinates: Examples include 1,2-ethanediol bis(dimethylphosphinate), 1,2-ethanediol bis(diethylphosphinate), 1,2-ethanediol bis(di-n-propylphosphinate), 1,2-ethanediol bis(diisopropylphosphinate), 1,2-ethanediol bis(di-n-butylphosphinate), 1,2-ethanediol bis(diisobutylphosphinate), 1,2-ethanediol bis(di-sec-butylphosphinate), 1,2-ethanediol bis(di-tert-butylphosphinate), 1,2-ethanediol bis[bis(trifluoromethyl)phosphinate)], 1,2-ethanediol bis[bis(2,2,2-trifluoroethyl)phosphinate)], 1,2-ethanediol bis[bis(pentafluoroethyl)phosphinate)], and the like.

Preferred of these are the 1,2-ethanediol bisphosphinates having methyl or ethyl groups which may be substituted with halogen atoms, such as 1,2-ethanediol bis(dimethylphosphinate), 1,2-ethanediol bis(diethylphosphinate), 1,2-ethanediol bis[bis(trifluoromethyl)phosphinate)], 1,2-ethanediol bis[bis(2,2,2-trifluoroethyl)phosphinate)], and 1,2-ethanediol bis[bis(pentafluoroethyl)phosphinate)].

1,3-Propanediol bisphosphinates: Examples include 1,3-propanediol bis(dimethylphosphinate), 1,3-propanediol bis(diethylphosphinate), 1,3-propanediol bis(di-n-propylphosphinate), 1,3-propanediol bis(diisopropylphosphinate), 1,3-propanediol bis(di-n-butylphosphinate), 1,3-propanediol bis(diisobutylphosphinate), 1,3-propanediol bis(di-sec-butylphosphinate), 1,3-propanediol bis(di-tert-butylphosphinate), 1,3-propanediol bis[bis(trifluoromethyl)phosphinate)], 1,3-propanediol bis[bis(2,2,2-trlfluoroethyl)phosphinate)], 1,3-propanediol bis[bis(pentafluoroethyl)phosphinate)], and the like.

Preferred of these are the 1,3-propanediol bisphosphinates having methyl or ethyl groups which may be substituted with halogen atoms, such as 1,3-propanediol bis(dimethylphosphinate), 1,3-propanediol bis(diethylphosphinate), 1,3-propanediol bis[bis(trifluoromethyl)phosphinate)], 1,3-propanediol bis[bis(2,2,2-trifluoroethyl)phosphinate)], and 1,3-propanediol bis[bis(pentafluoroethyl)phosphinate)].

1,4-Butanediol bisphosphinates: Examples include 1,4-butanediol bis(dimethylphosphinate), 1,4-butanediol bis(diethylphosphinate), 1,4-butanediol bis(di-n-propylphosphinate), 1,4-butanediol bis(diisopropylphosphinate), 1,4-butanediol bis(di-n-butylphosphinate), 1,4-butanediol bis(diisobutylphosphinate), 1,4-butanediol bis(di-sec-butylphosphinate), 1,4-butanediol bis(di-tert-butylphosphinate), 1,4-butanediol bis[bis(trifluoromethyl)phosphinate)], 1,4-butanediol bis[bis(2,2,2-trifluoroethyl)phosphinate)], 1,4-butanediol bis[bis(pentafluoroethyl)phosphinate)], and the like.

Preferred of these are the 1,4-butanediol bisphosphinates having methyl or ethyl groups which may be substituted with halogen atoms, such as 1,4-butanediol bis(dimethylphosphinate), 1,4-butanediol bis(diethylphosphinate), 1,4-butanediol bis[bis(trifluoromethyl)phosphinate)], 1,4-butanediol bis[bis(2,2,2-trifluoroethyl)phosphinate)], and 1,4-butanediol bis[bis(pentafluoroethyl)phosphinate)].

1,2-Propanediol bisphosphinates: Examples include 1,2-propanediol bis(dimethylphosphinate), 1,2-propanediol bis(diethylphosphinate), 1,2-propanediol bis(di-n-propylphosphinate), 1,2-propanediol bis(diisopropylphosphinate), 1,2-propanediol bis(di-n-butylphosphinate), 1,2-propanediol bis(diisobutylphosphinate), 1,2-propanediol bis(di-sec-butylphosphinate), 1,2-propanediol bis(di-tert-butylphosphinate), 1,2-propanediol bis[bis(trifluoromethyl)phosphinate)], 1,2-propanediol bis[bis(2,2,2-trifluoroethyl)phosphinate)], 1,2-propanediol bis[bis(pentafluoroethyl)phosphinate)], and the like.

Preferred of these are the 1,2-propanediol bisphosphinates having methyl or ethyl groups which may be substituted with halogen atoms, such as 1,2-propanediol bis(dimethylphosphinate), 1,2-propanediol bis(diethylphosphinate), 1,2-propanediol bis[bis(trifluoromethyl)phosphinate)], 1,2-propanediol bis[bis(2,2,2-trifluoroethyl)phosphinate)], and 1,2-propanediol bis[bis(pentafluoroethyl)phosphinate)].

1,2-Butanediol bisphosphinates: Examples include 1,2-butanediol bis(dimethylphosphinate), 1,2-butanediol bis(diethylphosphinate), 1,2-butanediol bis(di-n-propylphosphinate), 1,2-butanediol bis(diisopropylphosphinate), 1,2-butanediol bis(di-n-butylphosphinate), 1,2-butanediol bis(diisobutylphosphinate), 1,2-butanediol bis(di-sec-butylphosphinate), 1,2-butanediol bis(di-tert-butylphosphinate), 1,2-butanediol bis[bis(trifluoromethyl)phosphinate)], 1,2-butanediol bis[bis(2,2,2-trifluoroethyl)phosphinate)], 1,2-butanediol bis[bis(pentafluoroethyl)phosphinate)], and the like.

Preferred of these are the 1,2-butanediol bisphosphinates having methyl or ethyl groups which may be substituted with halogen atoms, such as 1,2-butanediol bis(dimethylphosphinate), 1,2-butanediol bis(diethylphosphinate), 1,2-butanediol bis[bis(trifluoromethyl)phosphinate)], 1,2-butanediol bis[bis(2,2,2-trifluoroethyl)phosphinate)], and 1,2-butanediol bis[bis(pentafluoroethyl)phosphinate)].

1,3-Butanediol bisphosphinates: Examples include 1,3-butanediol bis(dimethylphosphinate), 1,3-butanediol bis(diethylphosphinate), 1,3-butanediol bis(di-n-propylphosphinate), 1,3-butanediol bis(diisopropylphosphinate), 1,3-butanediol bis(di-n-butylphosphinate), 1,3-butanediol bis(diisobutylphosphinate), 1,3-butanediol bis(di-sec-butylphosphinate), 1,3-butanediol bis(di-tert-butylphosphinate), 1,3-butanediol bis[bis(trifluoromethyl)phosphinate)], 1,3-butanediol bis[bis(2,2,2-trifluoroethyl)phosphinate)], 1,3-butanediol bis[bis(pentafluoroethyl)phosphinate)], and the like.

Preferred of these are the 1,3-butanediol bisphosphinates having methyl or ethyl groups which may be substituted with halogen atoms, such as 1,3-butanediol bis(dimethylphosphinate), 1,3-butanediol bis(diethylphosphinate), 1,3-butanediol bis[bis(trifluoromethyl)phosphinate)], 1,3-butanediol bis[bis(2,2,2-trifluoroethyl)phosphinate)], and 1,3-butanediol bis[bis(pentafluoroethyl)phosphinate)].

(2) Trivalent Phosphinate Compounds 1,2,3-Propanetriol trisphosphinates: Examples include 1,2,3-propanetriol tris(dimethylphosphinate), 1,2,3-propanetriol tris(diethylphosphinate), 1,2,3-propanetriol tris(di-n-propylphosphinate), 1,2,3-propanetriol tris(diisopropylphosphinate), 1,2,3-propanetriol tris(di-n-butylphosphinate), 1,2,3-propanetriol tris(diisobutylphosphinate), 1,2,3-propanetriol tris(di-sec-butylphosphinate), 1,2,3-propanetriol tris(di-tert-butylphosphinate), 1,2,3-propanetriol tris[bis(trifluoromethyl)phosphinate)], 1,2,3-propanetriol tris[bis(2, 2,2-trifluoroethyl)phosphinate)], 1,2,3-propanetriol tris[bis (pentafluoroethyl)phosphinate)], and the like.

Preferred of these are the 1,2,3-propanetriol trisphosphinates having methyl or ethyl groups which may be substituted with halogen atoms, such as 1,2,3-propanetriol tris (dimethylphosphinate), 1,2,3-propanetriol tris (diethylphosphinate), 1,2,3-propanetriol tris[bis (trifluoromethyl)phosphinate)], 1,2,3-propanetriol tris[bis(2, 2,2-trifluoroethyl)phosphinate)], and 1,2,3-propanetriol tris [bis(pentafluoroethyl)phosphinate)].

1,2,3-Butanetriol trisphosphinates: Examples include 1,2, 3-butanetriol tris(dimethylphosphinate), 1,2,3-butanetriol tris(diethylphosphinate), 1,2,3-butanetriol tris(di-n-propylphosphinate), 1,2,3-butanetriol tris(diisopropylphosphinate), 1,2,3-butanetriol tris(di-n-butylphosphinate), 1,2,3-butanetriol tris(diisobutylphosphinate), 1,2,3-butanetriol tris (di-sec-butylphosphinate), 1,2,3-butanetriol tris(di-tert-butylphosphinate), 1,2,3-butanetriol tris[bis (trifluoromethyl)phosphinate)], 1,2,3-butanetriol 1,2,3-butanetriol tris[bis(pentafluoroethyl)phosphinate)], and the like.

Preferred of these are the 1,2,3-butanetriol trisphosphinates having methyl or ethyl groups which may be substituted with halogen atoms, such as 1,2,3-butanetriol tris (dimethylphosphinate), 1,2,3-butanetriol tris (diethylphosphinate), 1,2,3-butanetriol tris[bis (trifluoromethyl)phosphinate)], 1,2,3-butanetriol tris[bis(2, 2,2-trifluoroethyl)phosphinate)], and 1,2,3-butanetriol tris [bis(pentafluoroethyl)phosphinate)].

1,2,4-Butanetriol trisphosphinates: Examples include 1,2, 4-butanetriol tris(dimethylphosphinate), 1,2,4-butanetriol tris(diethylphosphinate), 1,2,4-butanetriol tris(di-n-propylphosphinate), 1,2,4-butanetriol tris(diisopropylphosphinate), 1,2,4-butanetriol tris(di-n-butylphosphinate), 1,2,4-butanetriol tris(diisobutylphosphinate), 1,2,4-butanetriol tris (di-sec-butylphosphinate), 1,2,4-butanetriol tris(di-tert-butylphosphinate), 1,2,4-butanetriol tris[bis (trifluoromethyl)phosphinate)], 1,2,4-butanetriol tris[bis(2, 2,2-trifluoroethyl)phosphinate)], 1,2,4-butanetriol tris[bis (pentafluoroethyl)phosphinate)], and the like.

Preferred of these are the 1,2,4-butanetriol trisphosphinates having methyl or ethyl groups which may be substituted with halogen atoms, such as 1,2,4-butanetriol tris (dimethylphosphinate), 1,2,4-butanetriol tris (diethylphosphinate), 1,2,4-butanetriol tris[bis (trifluoromethyl)phosphinate)], 1,2,4-butanetriol tris[bis(2, 2,2-trifluoroethyl)phosphinate)], and 1,2,4-butanetriol tris [bis(pentafluoroethyl)phosphinate)].

(3) Tetravalent Phosphinate Compounds 1,2,3,4-Butanetetrol tetrakisphosphinates: Examples include 1,2,3,4-butanetetrol tetrakis(dimethylphosphinate), 1,2,3,4-butanetetrol tetrakis(diethylphosphinate), 1,2,3,4-butanetetrol tetrakis(di-n-propylphosphinate), 1,2,3,4-butanetetrol tetrakis(diisopropylphosphinate), 1,2,3,4-butanetetrol tetrakis(di-n-butylphosphinate), 1,2,3,4-butanetetrol tetrakis(diisobutylphosphinate), 1,2,3,4-butanetetrol tetrakis (di-sec-butylphosphinate), 1,2,3,4-butanetetrol tetrakis(di-tert-butylphosphinate), 1,2,3,4-butanetetrol tetrakis[bis(trifluoromethyl)phosphinate)], 1,2,3,4-butanetetrol tetrakis[bis (2,2,2-trifluoroethyl)phosphinate)], 1,2,3,4-butanetetrol tetrakis[bis(pentafluoroethyl)phosphinate)], and the like.

Preferred of these are the 1,2,3,4-butanetetrol tetrakisphosphinates having methyl or ethyl groups which may be substituted with halogen atoms, such as 1,2,3,4-butanetetrol tetrakis(dimethylphosphinate), 1,2,3,4-butanetetrol tetrakis (diethylphosphinate), 1,2,3,4-butanetetrol tetrakis[bis(trifluoromethyl)phosphinate)], 1,2,3,4-butanetetrol tetrakis[bis (2,2,2-trifluoroethyl)phosphinate)], and 1,2,3,4-butanetetrol tetrakis[bis(pentafluoroethyl)phosphinate)].

The molecular weight of the phosphinic ester compound is generally 500 or lower, preferably 400 or lower, more preferably 350 or lower. In case where the molecular weight thereof is too high, the phosphinic ester compound shows poor solubility in the electrolyte solution, resulting in the possibility that the effects of the invention cannot be sufficiently produced.

The phosphinic ester compounds represented by the formulae (1) and (2) may be used alone or as a mixture of two or more thereof.

The total content of all phosphinic ester compounds in the nonaqueous electrolyte solution is generally 0.01% by weight or higher, preferably 0.05% by weight or higher, more preferably 0.1% by weight or higher, and is generally 4.5% by weight or lower, preferably 3% by weight or lower, more preferably 2.5% by weight or lower, based on the total weight of the nonaqueous electrolyte solution. Any desired combination of a lower limit and upper limit of phosphinic ester compound content can be used as long as these are in the ranges shown above.

In case where the concentration of the phosphinic ester compounds is too low, sufficient effects are not obtained. On the other hand, too high concentrations thereof result in a decrease in battery characteristics such as rate characteristics.

The nonaqueous electrolyte solution according to the invention may contain other agents in common use according to need, such as, e.g., an overcharge protection agent and a film formation agent for forming a film (SEI) on the surface of an active material in the cell. Examples of the overcharge protection agent include biphenyl and derivatives thereof, cyclohexylbenzene and derivatives thereof, dibenzofuran and derivatives thereof, terphenyl and derivatives thereof, diphenyl ether and derivatives thereof, and the like. Examples of the film formation agent include vinylene carbonate, vinylethylene carbonate, and the like.

The concentration of an agent in the nonaqueous electrolyte solution is generally 0.1% by weight or higher, preferably 0.5% by weight or higher, more preferably 1% by weight or higher, and is generally 10% by weight or lower, preferably 8% by weight or lower, more preferably 6% by weight or lower, based on the total weight of the nonaqueous electrolyte solution. The same concentration ranges apply in the case where two or more agents are used in combination.

The nonaqueous electrolyte solution for a secondary battery according to the invention can be prepared by dissolving the solute and phosphinic ester compound described above in the nonaqueous organic solvent described above optionally together with other agents. It is preferred that in preparing the nonaqueous electrolyte solution, the raw materials for the nonaqueous electrolyte solution be dehydrated beforehand. The raw materials are dehydrated to generally 50 ppm or below, preferably 30 ppm or below. When water is present in the nonaqueous electrolyte solution, there is the possibility that water electrolysis, solute hydrolysis due to the reaction of water with the solute, etc might occur. Techniques for dehydration are not particularly limited. However, in the case of liquids such as solvents, water may be adsorptively removed with a molecular sieve or the like. Furthermore, in the case of solids such as solutes, they may be dried at a temperature lower than the temperatures at which decomposition occurs.

The nonaqueous electrolyte solution for a secondary battery according to the invention is suitable for use as an electrolyte solution for a lithium secondary battery. The lithium secondary battery according to the invention, which employs the electrolyte solution, will be explained below.

The lithium secondary battery according to the invention is the same as known secondary battery except the electrolyte solution. Usually, a positive electrode and a negative electrode have been packed in a case so that a separator containing the nonaqueous electrolyte solution of the invention is interposed between the electrodes. Consequently, the shape of the secondary battery according to the invention is not particularly limited, and may be any of the cylindrical type containing sheet electrodes and separators which have been spirally wound, the cylindrical type of an inside-out structure employing a combination of pellet electrodes and a separator, and the coin type containing pellet electrodes and a separator which have been superposed.

Examples of positive-electrode active materials include inorganic compounds such as oxides of transition metals, transition metal/lithium composite oxides, sulfides of transition metals, and metal oxides, lithium metal, and lithium alloys. Specific examples thereof include transition metal oxides such as $MnO$, $V_2O_5$, $V_6O_{13}$, and $TiO_2$, lithium-transition metal composite oxides such as lithium/cobalt composite oxides whose basic composition is $LiCoO_2$, lithium/nickel composite oxides whose basic composition is $LiNiO_2$, and lithium/manganese composite oxides whose basic composition is $LiMn_2O_4$ or $LiMnO_2$, such as $SnO_2$ and $SiO_2$. Of these, the lithium-transition metal composite oxides, in particular, lithium/cobalt composite oxides, lithium/nickel composite oxides, and lithium/cobalt/nickel composite oxides, are advantageously used because these active materials can attain both of high capacity and high cycle characteristics. Furthermore, those lithium-transition metal composite oxides are preferred because the structures thereof can be stabilized by replacing part of the cobalt, nickel, or manganese with another metal such as Al, Ti, V, Cr, Mn, Fe, Co, Li, Ni, Cu, Zn, Mg, Ga, or Zr. Positive-electrode active materials may be used alone or as a mixture of two or more thereof.

As a negative-electrode active material can be used any substance capable of absorbing and releasing lithium, such as lithium metal or a lithium alloy. However, a carbonaceous material is preferred because it is satisfactory in cycle characteristics and safety. Examples of the carbonaceous material include natural or artificial graphite, carbonized pitches, products of the carbonization of phenol resins, cellulose, etc., pitch-derived carbon fibers, PAN-derived carbon fibers, and graphitized mesophase microspheres or the like, and further include furnace black, acetylene black, and graphitized materials obtained from these. Also usable advantageously are materials obtained by coating these carbonaceous materials with an organic substance, e.g., a pitch, and then burning the coated materials to form carbon, which is more amorphous than these carbonaceous materials, on the surface.

Those carbonaceous materials preferably are ones in which the value of d (interplanar spacing) for a lattice plane (002 plane) as determined through X-ray diffraction by a method of the Japan Society for Promotion of Scientific Research is from 0.335 to 0.340 nm, and more preferably are ones in which the value of d is from 0.335 to 0.337 nm. Those carbonaceous materials have an ash content of preferably 1% by weight or lower, more preferably 0.5% by weight or lower, especially preferably 0.1% by weight or lower. Furthermore, the crystallite size (Lc) thereof, as determined by the method of the Japan Society for Promotion of Scientific Research, is preferably 30 nm or larger, more preferably 50 nm or larger, especially preferably 100 nm or larger.

Examples of binders for binding the active materials include fluororesins such as poly(vinylidene fluoride) and polytetrafluoroethylene, styrene/butadiene rubbers, isoprene rubbers, butadiene rubbers, poly(vinyl acetate), poly(ethyl methacrylate), polyethylene, nitrocellulose, and the like.

The amount of the binder to be used per 100 parts by weight of an active material is generally 0.1 part by weight or larger, preferably 1 part by weight or larger, and is generally 30 parts by weight or smaller, preferably 20 parts by weight or smaller. Too small binder amounts tend to result in a reduced electrode strength. Conversely, too large binder amounts tend to result in a reduced ionic conductivity.

Agents having various functions, such as a conductive material or reinforcement for improving electrical conductivity or mechanical strength, powders, fillers, and thickeners may be incorporated into the electrodes. The conductive material is not particularly limited as long as it can impart conductivity to the active materials when mixed therewith in an appropriate amount. However, examples thereof generally include fibers or foils of various metals including copper and nickel and carbonaceous materials such as graphite and carbon black. It is preferred to contain a conductive material especially into the positive electrode. Examples of the thickeners include carboxyethyl cellulose, ethyl cellulose, hydroxyethyl cellulose, ethyl cellulose, poly(vinyl alcohol), oxidized starch, phosphorylated starch, case in, and the like.

The electrodes may be produced in the following manner. A mixture prepared by mixing an active material with a binder, a conductive material, and other ingredients is subjected as it is to roll forming to obtain a sheet electrode or to compression molding to obtain a pellet electrode. In general, however, the electrodes are formed by mixing an active material with a binder, a conductive material, and other ingredients, slurrying the mixture with a solvent, applying the slurry to a current collector, and drying the coating.

The thickness on a dry basis of the active-material layer formed through coating is generally 1 μm or larger, preferably 10 μm or larger, more preferably 20 μm or larger, most preferably 40 μm or larger, and is generally 200 μm or smaller, preferably 150 μm or smaller, more preferably 100 μm or smaller. Too small thicknesses not only make even coating difficult but also result in a reduced cell capacity. On the other hand, too large thicknesses result in reduced rate characteristics.

As the current collector is generally used a metal or alloy. Specifically, examples of the negative-electrode current collector include copper and alloys thereof, nickel and alloys thereof, stainless steel, and the like. Preferred of these are copper and alloys thereof. Examples of the positive-electrode current collector include aluminum, titanium, tantalum, alloys of these, and the like. Preferred of these are aluminum and alloys thereof. It is preferred to roughen the surface of these current collectors beforehand in order to improve the effect of bonding to the active-material layer to be formed on the surface. Examples of techniques for surface roughening include blasting, rolling with a surface-roughening roll, a mechanical polishing method in which the current collector surface is polished with an abrasive cloth/paper having abrasive particles fixed thereto or with a grinding stone, emery wheel, wire brush having steel or other bristles, or the like, an electrolytic polishing method, a chemical polishing method, and the like.

Furthermore, a perforated type current collector such as an expanded metal or punching metal may be used in order to reduce the weight of the current collector and thereby improve the energy density per unit weight of the battery. This type of current collector can be varied in weight at will by changing the percentage of openings thereof. In the case where an active-material layer is formed on each side of this type of current collector, the active-material layers are even less apt to peel off because of the effect of riveting through the openings. However, too high percentages of openings may reduce, rather than increase, the bonding strength because the area of contact between the active-material layers and the current collector decreases.

The thickness of the current collector is generally 1 µm or larger, preferably 5 µm or larger, and is generally 100 µm or smaller, preferably 50 µm or smaller. Too large thicknesses thereof result in too large a decrease in the capacity of the whole battery. Conversely, too small thicknesses thereof may result in difficulties in handling.

The nonaqueous electrolyte solution may be used in a semisolid state obtained by causing the solution to gel with a gellant such as a polymer. The proportion of the nonaqueous electrolyte solution in the semisolid electrolyte is generally 30% by weight or higher, preferably 50% by weight or higher, more preferably 75% by weight or higher, and is generally 99.95% by weight or lower, preferably 99% by weight or lower, more preferably 98% by weight or lower, based on the total amount of the semisolid electrolyte. Too high proportions of the electrolyte solution are apt to result in liquid leakage because of difficulties in holding the electrolyte solution. Conversely, too low proportions thereof may result in an insufficient charge/discharge efficiency or an insufficient capacity.

A separator is interposed between the positive electrode and the negative electrode for the purpose of preventing short-circuiting. In this case, the electrolyte solution to be used is infiltrated into the separator. Although the material and shape of the separator are not particularly limited, it is preferred to use a porous sheet, nonwoven fabric, or the like which is made of a material stable to the electrolyte solution and excellent in liquid retentivity. Usable separator materials include polyolefins such as polyethylene and polypropylene, polytetrafluoroethylene, polyethersulfones, and the like. However, polyolefins are preferred.

The thickness of the separator is generally 1 µm or larger, preferably 5 µm or larger, more preferably 10 µm or larger, and is generally 50 µm or smaller, preferably 40 µm or smaller, more preferably 30 µm or smaller. Too thin separators may have impaired insulating properties or impaired mechanical strength. Too large thicknesses thereof not only impair battery performances including rate characteristics but also reduce the energy density of the battery as a whole.

The porosity of the separator is generally 20% or higher, preferably 35% or higher, more preferably 45% or higher, and is generally 90% or lower, preferably 85% or lower, more preferably 75% or lower. Too low porosities thereof tend to result in increased film resistance and impaired rate characteristics. On the other hand, separators having too high a porosity tend to have reduced mechanical strength and reduced insulating properties.

The average pore diameter of the separator is generally 0.5 µm or smaller, preferably 0.2 µm or smaller, and is generally 0.05 µm or larger. Too large average pore diameters thereof are apt to result in short-circuiting, while too small average pore diameters thereof may result in increased film resistance and impaired rate characteristics.

EXAMPLES

The invention will be explained below in more detail by reference to Examples, but the invention should not be construed as being limited to the following Examples unless the invention departs from the spirit thereof.

(Production of Positive Electrode)

Ninety parts by weight of lithium cobalt oxide ($LiCoO_2$) was mixed with 5 parts by weight of acetylene black and 5 parts by weight of poly (vinylidene fluoride) (hereinafter sometimes referred to as "PVdF"). N-Ethylpyrroldone was added to the mixture to slurry it. This slurry was applied to one side of an aluminum foil having a thickness of 20 µm and dried. The coated foil was rolled with a pressing machine. A disk having a diameter of 12 mm was punched out therefrom with a punch to obtain a positive electrode.

(Production of Negative Electrode)

Ninety-five parts by weight of graphite (interplanar spacing, 0.336 nm) was mixed with 5 parts by weight of PVdF, and N-ethylpyrrolidone was added to the mixture to slurry it. This slurry was applied to one side of a copper foil having a thickness 20 µm and dried. The coated foil was rolled with a pressing machine. A disk having a diameter of 12 mm was punched out therefrom to obtain a negative electrode.

(Production of Lithium Secondary Battery)

In a dry box filled with an argon atmosphere, a lithium secondary battery was fabricated using CR2032 type coin cell cases. Namely, the positive electrode was placed in a coin cell case (positive-electrode can). A porous polyethylene film (separator) having a thickness of 25 µm was placed on the positive electrode, and a gasket made of polypropylene was placed thereon so as to press the separator. The negative electrode was placed on the gasket and a spacer for thickness regulation was further placed thereon. An electrolyte solution was added thereto and sufficiently infiltrated into the battery. Thereafter, a coin cell case (negative-electrode can) was placed thereon and the resultant structure was sealed to fabricate a battery.

Incidentally, in the following Examples and Comparative Examples, the battery was designed to have a capacity of about 4.0 mAh when determined with an upper limit in charge of 4.2 V and a lower limit in discharge of 3.0 V.

The proportion of the weight of the positive-electrode active material, W(c), to the weight of the negative-electrode active material, W(a), was determined so that the capacity ratio Rq between the negative electrode and the positive electrode satisfied $1.1 \leq Rq \leq 1.2$. Incidentally, the capacity ratio Rq was determined using the following equation:

$$Rq = \{Q(a) \times W(a)\}/\{Q(c) \times W(c)\}$$

wherein Q(c) (mAh/g) is the electric capacity per unit weight of the positive-electrode active material as measured under the conditions corresponding to initial cell charge conditions; and Q(a) (mAh/g) is the electric capacity per unit weight in which the negative-electrode active material can occlude a maximum amount of lithium without causing lithium Incidentally, Q(c) and Q(a) were determined in the following manner. Test batteries were fabricated using the positive electrode or negative electrode as a working electrode, lithium metal as a counter electrode, and the same electrolyte solution as that used in fabricating the cell described above and further using a separator, which was interposed between the working electrode and the counter electrode. The capacity in which the positive electrode could be charged (lithium ions could be released from the positive electrode) or the negative electrode could be discharged (lithium ions could be occluded by the negative electrode) to initial-charge conditions (upper-limit potential of the positive electrode or lower-limit potential of the negative electrode) at the lowest possible current density was determined as Q(c) or Q(a), respectively.

(Evaluation of a Battery)

(1) High-Temperature Storage Test

The lithium secondary battery obtained was charged at room temperature by the constant-current constant-voltage method at 1 C (4.0 mA) to an upper limit of 4.2 V, and the charge was terminated when the current value reached 0.05 mA. Subsequently, the battery was discharged to 3.0 V at 0.2 C.

Here, 1 C represents the current value at which full charge necessitates 1 hour. In the secondary battery used in the following Examples and Comparative Examples, 1 C is 4.0 mA. Consequently, 0.2 C is 0.8 mA.

Subsequently, the battery was charged at room temperature by the constant-current constant-voltage method at 1 C to an upper limit of 4.2 V, and the charge was terminated when the current value reached 0.05 mA. This charged battery was held at 60° C. for 7 days, subsequently cooled to room temperature, and examined for discharge capacity. The larger the value of discharge capacity after high-temperature storage, the less the battery has deteriorated through the high-temperature storage and the higher the thermal stability thereof.

(2) High-Temperature Trickle Charge Test

The lithium secondary battery obtained was charged by the constant-current constant-voltage method at 1 C to an upper limit of 4.2 V, and the charge was terminated when the current value reached 0.05 mA. Subsequently, the battery was discharged to 3.0 V at a constant current of 0.2 C. Furthermore, the battery was charged at room temperature by the constant-current constant-voltage method at 1 C to an upper limit of 4.2 V, and the charge was terminated when the current value reached 0.05 mA. This charged battery was subjected to 4.2-V constant-voltage charge at 60° C. for 7 days (high-temperature trickle charge) to determine the charge capacity. After completion of this charge, the battery was cooled to room temperature and examined for discharge capacity.

The charge capacity after the high-temperature trickle charge is the quantity of electric current used for compensating for the voltage which has decreased due to decomposition of the electrolyte solution. The smaller the value of this charge capacity, the more the decomposition of the electrolyte solution has been prevented. On the other hand, the larger the value of the discharge capacity after the high-temperature trickle charge, the less the battery has deteriorated through the high-temperature trickle charge and the higher the thermal stability thereof.

Example 1

In a mixed solvent consisting of ethylene carbonate (EC) and diethyl carbonate (DEC) in a volume ratio of 3:7 was dissolved lithium hexafluorophosphate (LiPF$_6$) in a concentration of 1 mol/L. Thus, a base electrolyte solution was obtained. Ethyl diethylphosphinate was added thereto in an amount of 1% by weight to prepare an electrolyte solution.

The electrolyte solution obtained was used to fabricate a lithium secondary battery, which was subjected to the high-temperature storage test and the high-temperature trickle charge test. The results thereof are shown in Tables 1, 2, and 3.

Example 2

An electrolyte solution prepared by adding ethyl diethylphosphinate and vinylene carbonate to the base electrolyte solution in amounts of 1% by weight and 2% by weight, respectively, was used to fabricate a lithium secondary battery. The battery was subjected to the high-temperature storage test and the high-temperature trickle charge test. The results thereof are shown in Tables 1 and 2.

Example 3

An electrolyte solution prepared by adding ethyl diethylphosphinate, vinylene carbonate, and cyclohexylbenzene to the base electrolyte solution in amounts of 1% by weigh, 2% by weight, and 2% by weight, respectively, was used to fabricate a lithium secondary battery. The battery was subjected to the high-temperature storage test and the high-temperature trickle charge test. The results thereof are shown in Tables 1 and 2.

Example 4

An electrolyte solution prepared by adding n-butyl di-n-butylphosphinate to the base electrolyte solution in an amount of 1% by weight was used to fabricate a lithium secondary battery. The battery was subjected to the high-temperature storage test and the high-temperature trickle charge test. The results thereof are shown in Tables 1 and 2.

Example 5

An electrolyte solution prepared by adding n-butyl di-n-butylphosphinate and vinylene carbonate to the base electrolyte solution in amounts of 1% by weight and 2% by weight, respectively, was used to fabricate a lithium secondary battery. The battery was subjected to the high-temperature storage test and the high-temperature trickle charge test. The results thereof are shown in Tables 1 and 2.

Example 6

An electrolyte solution prepared by adding methyl n-butylmethylphosphinate to the base electrolyte solution in an amount of 1% by weight was used to fabricate a lithium secondary battery. The battery was subjected to the high-temperature storage test and the high-temperature trickle charge test. The results thereof are shown in Tables 1 and 2.

Example 7

An electrolyte solution prepared by adding methyl n-butylmethylphosphinate and vinylene carbonate to the base electrolyte solution in amounts of 1% by weight and 2% by weight, respectively, was used to fabricate a lithium secondary battery. The battery was subjected to the high-temperature storage test and the high-temperature trickle charge test. The results thereof are shown in Tables 1 and 2.

Example 8

An electrolyte solution prepared by adding methyl methylphenylphosphinate to the base electrolyte solution in an amount of 1% by weight was used to fabricate a lithium secondary battery. The battery was subjected to the high-temperature storage test and the high-temperature trickle charge test. The results thereof are shown in Tables 1 and 2.

Example 9

An electrolyte solution prepared by adding methyl methylphenylphosphinate and vinylene carbonate to the base electrolyte solution in amounts of 1% by weight and 2% by weight, respectively, was used to fabricate a lithium secondary battery. The battery was subjected to the high-temperature storage test and the high-temperature trickle charge test. The results thereof are shown in Tables 1 and 2.

Example 10

An electrolyte solution prepared by adding ethyl diethylphosphinate to the base electrolyte solution in an amount of 0.1% by weight was used to fabricate a lithium secondary battery. The battery was subjected to the high-temperature Example 11

An electrolyte solution prepared by adding ethyl diethylphosphinate to the base electrolyte solution in an amount of 0.25% by weight was used to fabricate a lithium secondary battery. The battery was subjected to the high-temperature storage test. The results thereof are shown in Table 3.

Example 12

An electrolyte solution prepared by adding ethyl diethylphosphinate to the base electrolyte solution in an amount of 0.5% by weight was used to fabricate a lithium secondary battery. The battery was subjected to the high-temperature storage test. The results thereof are shown in Table 3.

Example 13

An electrolyte solution prepared by adding ethyl diethylphosphinate to the base electrolyte solution in an amount of 4% by weight was used to fabricate a lithium secondary battery. The battery was subjected to the high-temperature storage test. The results thereof are shown in Table 3.

Comparative Example 1

The base electrolyte solution by itself was used to fabricate a lithium secondary battery. The battery was subjected to the high-temperature storage test and the high-temperature trickle charge test. The results thereof are shown in Tables 1, 2, 3, 4, and 5.

Comparative Example 2

An electrolyte solution prepared by adding vinylene carbonate to the base electrolyte solution in an amount of 2% by weight was used to fabricate a lithium secondary battery. The battery was subjected to the high-temperature storage test and the high-temperature trickle charge test. The results thereof are shown in Tables 1, 2, 3, 4, and 5.

Comparative Example 3

An electrolyte solution prepared by adding vinylene carbonate and cyclohexylbenzene to the base electrolyte solution in amounts of 2% by weight and 2% by weight, respectively, was used to fabricate a lithium secondary battery. The battery was subjected to the high-temperature storage test and the high-temperature trickle charge test. The results thereof are shown in Tables 1, 2, 3, 4, and 5.

Comparative Example 4

An electrolyte solution prepared by adding ethyl diethylphosphinate to the base electrolyte solution in an amount of 5% by weight was used to fabricate a lithium secondary battery. The battery was subjected to the high-temperature storage test. The results thereof are shown in Table 3.

TABLE 1

| | Compound of formula (1) | | Agent | | Capacity after high-temperature storage (mAh/g) |
|---|---|---|---|---|---|
| | Compound name | Amount (wt %) | Compound name | Amount (wt %) | |
| Ex. 1 | ethyl diethylphosphinate | 1 | none | 0 | 121 |
| Ex. 2 | ethyl diethylphosphinate | 1 | vinylene carbonate | 2 | 137 |
| Ex. 3 | ethyl diethylphosphinate | 1 | vinylene carbonate cyclohexylbenzene | 2 2 | 117 |
| Ex. 4 | n-butyl di-n-butylphosphinate | 1 | none | 0 | 118 |
| Ex. 5 | n-butyl di-n-butylphosphinate | 1 | vinylene carbonate | 2 | 133 |
| Ex. 6 | methyl n-butylmethylphosphinate | 1 | none | 0 | 117 |
| Ex. 7 | methyl n-butylmethylphosphinate | 1 | vinylene carbonate | 2 | 129 |

TABLE 1-continued

| | Compound of formula (1) | | Agent | | Capacity after high-temperature storage (mAh/g) |
|---|---|---|---|---|---|
| | Compound name | Amount (wt %) | Compound name | Amount (wt %) | |
| Ex. 8 | methyl methyl-phenyl-phosphinate | 1 | none | 0 | 120 |
| Ex. 9 | methyl methyl-phenyl-phosphinate | 1 | vinylene carbonate | 2 | 134 |
| Comp. Ex. 1 | none | 0 | none | 0 | 110 |
| Comp. Ex. 2 | none | 0 | vinylene carbonate | 2 | 127 |
| Comp. Ex. 3 | none | 0 | vinylene carbonate cyclohexylbenzene | 2 2 | 111 |

Table 1 shows that the incorporation of a small amount of a phosphinic ester represented by formula (1) into an electrolyte solution is effective in inhibiting the battery from deteriorating in high-temperature storage. It can be further seen that this deterioration-inhibitive effect is produced even when the ester is used in combination with a known film-forming agent (vinylene carbonate) or overcharge inhibitor (cyclohexylbenzene).

TABLE 2

| | High-temperature trickle-charge capacity (mAh/g) | Capacity after high-temperature trickle charge (mAh/g) |
|---|---|---|
| Example 1 | 24 | 113 |
| Example 2 | 29 | 130 |
| Example 3 | 28 | 126 |
| Example 4 | 29 | 108 |
| Example 5 | 36 | 123 |
| Example 6 | 39 | 110 |
| Example 7 | 42 | 120 |
| Example 8 | 26 | 112 |
| Example 9 | 29 | 125 |
| Comparative Example 1 | 42 | 89 |
| Comparative Example 2 | 59 | 110 |
| Comparative Example 3 | 42 | 75 |

Table 2 shows that the incorporation of a small amount of a phosphinic ester represented by formula (1) into an electrolyte solution is effective in preventing the decomposition of the electrolyte solution during high-temperature trickle charge and thereby preventing battery deterioration. It can be further seen that this effect is produced even when the ester is used in combination with a known film-forming agent or a known overcharge protection agent (cyclohexylbenzene).

TABLE 3

| | Phosphinic ester | | Agent | | Capacity after high-temperature storage (mAh/g) |
|---|---|---|---|---|---|
| | Compound name | Amount (wt %) | Compound name | Amount (wt %) | |
| Comp. Ex. 1 | none | 0 | none | 0 | 110 |
| Ex. 10 | ethyl diethyl-phosphinate | 0.1 | none | 0 | 115 |
| Ex. 11 | ethyl diethyl-phosphinate | 0.25 | none | 0 | 114 |
| Ex. 12 | ethyl diethyl-phosphinate | 0.5 | none | 0 | 117 |
| Ex. 1 | ethyl diethyl-phosphinate | 1 | none | 0 | 121 |
| Ex. 13 | ethyl diethyl-phosphinate | 4 | none | 0 | 114 |
| Comp. Ex. 4 | ethyl diethyl-phosphinate | 5 | none | 0 | 108 |

Table 3 shows that battery deterioration in high-temperature storage can be prevented when the concentration of the phosphinic ester represented by formula (1) in an electrolyte solution is from 0.01% by weight to 4.5% by weight.

Example 14

To the base electrolyte solution was added 1,4-butanediol bis(diethylphosphinate) in an amount of 1% by weight to prepare an electrolyte solution.

The electrolyte solution obtained was used to fabricate a lithium secondary battery, which was subjected to the high-temperature storage test. The results thereof are shown in Tables 4 and 5.

Example 15

An electrolyte solution prepared by adding 1,4-butanediol bis(diethylphosphinate) and vinylene carbonate to the base electrolyte solution in amounts of 1% by weight and 2% by weight, respectively, was used to fabricate a lithium secondary battery. The battery was subjected to the high-temperature storage test. The results thereof are shown in Table 4.

Example 16

An electrolyte solution prepared by adding 1,4-butanediol bis(diethylphosphinate), vinylene carbonate, andcyclohexylbenzene to the base electrolyte solution in amounts of 1% by weight, 2% by weight, and 2% by weight, respectively, was used to fabricate a lithium secondary battery. The battery was subjected to the high-temperature storage test. The results thereof are shown in Table 4.

Comparative Example 5

An electrolyte solution prepared by adding 1,4-butanediol bis(diethylphosphinate) to the base electrolyte solution in an amount of 8% by weight was used to fabricate a lithium secondary battery. The battery was subjected to the high-temperature storage test. The results thereof are shown in Table 5.

Comparative Example 6

An electrolyte solution prepared by adding 1,4-butanediol bis(diethylphosphinate) to the base electrolyte solution in an amount of 15% by weight was used to fabricate a lithium secondary battery. The battery was subjected to the high-temperature storage test. The results thereof are shown in Table 5.

deteriorating in high-temperature storage. It can be further seen that this deterioration-inhibitive effect is produced even when the ester is used in combination with a known film-forming agent (vinylene carbonate) or overcharge protection agent (cyclohexylbenzene).

TABLE 5

| | Phosphinic ester | | Agent | | Capacity after high-temperature storage (mAh/g) |
|---|---|---|---|---|---|
| | Compound name | Amount (wt %) | Compound name | Amount (wt %) | |
| Comp. Ex. 1 | none | 0 | none | 0 | 110 |
| Ex. 14 | 1,4-butanediol bis(diethyl-phosphinate) | 1 | none | 0 | 124 |
| Comp. Ex. 5 | 1,4-butanediol bis(diethyl-phosphinate) | 8 | none | 0 | 112 |
| Comp. Ex. 6 | 1,4-butanediol bis(diethyl-phosphinate) | 15 | none | 0 | 101 |

Table 5 shows that battery deterioration in high-temperature storage can be prevented by containing the phosphinic ester represented by formula (2) in an electrolyte solution in an amount of from 0.01% by weight to 4.5% by weight.

While the invention has been described in detail and with reference to specific embodiments thereof, it will be apparent to one skilled in the art that various changes and modifications can be made therein without departing from the spirit and scope thereof.

TABLE 4

| | Phosphinic ester | | Agent | | Capacity after high-temperature storage (mAh/g) |
|---|---|---|---|---|---|
| | Compound name | Amount (wt %) | Compound name | Amount (wt %) | |
| Ex. 14 | 1,4-butanediol bis(diethyl-phosphinate) | 1 | none | 0 | 124 |
| Ex. 15 | 1,4-butanediol bis(diethyl-phosphinate) | 1 | vinylene carbonate | 2 | 135 |
| Ex. 16 | 1,4-butanediol bis(diethyl-phosphinate) | 1 | vinylene carbonate cyclohexylbenzene | 2 2 | 118 |
| Comp. Ex. 1 | none | 0 | none | 0 | 110 |
| Comp. Ex. 2 | none | 0 | vinylene carbonate | 2 | 127 |
| Comp. Ex. 3 | none | 0 | vinylene carbonate cyclohexylbenzene | 2 2 | 111 |

Table 4 shows that the incorporation of a small amount of a phosphinic ester represented by formula (2) into an electrolyte solution is effective in preventing the battery from This application is based on a Japanese patent application filed on Oct. 22, 2002 (Application No. 2002-306901), a Japanese patent application filed on May 14, 2003 (Application No. 2003-136322), and a Japanese patent application filed on Dec. 24, 2002 (Application No. 2002-372323), the entire contents thereof being cited by reference.

INDUSTRIAL APPLICABILITY

The nonaqueous electrolyte solution for a secondary high-temperature trickle charge or high-temperature storage, and can be used as an electrolyte solution for a lithium secondary battery in secondary-battery applications in portable appliances such as portable personal computers and cellular phone. Consequently, the electrolyte solution is of great industrial significance.

What is claimed is:

1. A nonaqueous electrolyte solution for a secondary battery, comprising solute, phosphinic ester compound, and nonaqueous organic solvent containing them, wherein the content of the phosphinic ester compound is from 0.01% by weight to 4.0% by weight, based on the total weight of the nonaqueous electrolyte solution.

2. The nonaqueous electrolyte solution for a secondary battery according to claim 1, wherein the phosphinic ester is at least one selected from the group consisting of compounds represented by the following formula (1) and compounds represented by the following formula (2):

wherein $R_1$ to $R_3$ each independently represents one member selected from the group consisting of (i) a chain or cyclic alkyl group which has 1 to 8 carbon atoms and may be substituted with one or more halogen atoms, (ii) a phenyl group which may be substituted with one or more halogen atoms, (iii) a phenyl group which may be substituted with one or more alkyl groups having 1 to 4 carbon atoms, and (iv) a phenyl group which may be substituted with one or more halogen atoms and one or more alkyl groups having 1 to 4 carbon atoms, provided that when the pair of $R_1$ and $R_2$ or the pair of $R_2$ and $R_3$ is alkyl groups, then the groups may be bonded to each other to form a ring structure:

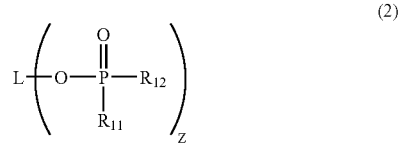

wherein $R_{11}$ and $R_{12}$ each independently represents a chain or cyclic alkyl group, which has 1 to 8 carbon atoms and may be substituted with one or more halogen atoms or a phenyl group which may be substituted with one or more halogen atoms, provided that when $R^{11}$ and $R_{12}$ each is an alkyl group, they may be bonded to each other to form a ring structure, L represents a connecting group having a valence of z and constituted of one or more atoms selected from the group consisting of a carbon atom, a hydrogen atom, and an oxygen atom, and z represents an integer of 2 to 8.

3. The nonaqueous electrolyte solution for a secondary battery according to claim 2, wherein the phosphinic ester comprises a compound having formula (1), wherein $R_1$ to $R_3$ each independently represents one selected from the group consisting of (i) a chain alkyl group which has 1 to 8 carbon atoms and may be substituted with one or more halogen atoms, (ii) a phenyl group which may be substituted with one or more halogen atoms, (iii) a phenyl group which may be substituted with one or more alkyl groups having 1 to 4 carbon atoms, and (iv) a phenyl group which may be substituted with one or more halogen atoms and one or more alkyl groups having 1 to 4 carbon atoms.

4. The nonaqueous electrolyte solution for a secondary battery according to claim 2, wherein the phosphinic ester comprises a compound having formula (2), wherein $R_{11}$ and $R_{12}$ each independently represents a chain alkyl group which has 1 to 4 carbon atoms and may be substituted with one or more halogen atoms, L represents a chain hydrocarbon connecting group having a valence of z and having 2 to 8 carbon atoms, and z represents an integer of 2 to 4.

5. The nonaqueous electrolyte solution for a secondary battery according to claim 1, wherein the nonaqueous electrolyte solution for a secondary battery further comprises an overcharge inhibitor or a film formation agent.

6. The nonaqueous electrolyte solution for a secondary battery according to claim 1, wherein the nonaqueous organic solvent in the nonaqueous electrolyte solution is a mixed solvent comprising a cyclic carbonate and a member selected from the group consisting of chain carbonates and cyclic esters.

7. A nonaqueous-electrolyte secondary battery comprising a negative electrode capable of absorbing/releasing lithium, a positive electrode, and the nonaqueous electrolyte solution for a secondary battery defined in claim 1.

8. The nonaqueous-electrolyte secondary battery according to claim 7, wherein the positive electrode comprises a lithium-transition metal composite oxide.

9. The nonaqueous-electrolyte secondary battery according to claim 7, wherein the negative electrode comprises a carbonaceous material wherein the value of d for a lattice plane (002 plane) in X-ray diffraction is from 0.335 to 0.340 nm.

10. The nonaqueous electrolyte solution for a secondary battery according to claim 1, wherein the content of the phosphinic ester compound is from 0.01% by weight to 1.0% by weight, based on the total weight of the nonaqueous electrolyte solution.

11. A secondary battery comprising the nonaqueous electrolyte solution for a secondary battery as claimed in claim 1.

12. A method for producing the secondary battery as claimed in claim 11 comprising adding the nonaqueous electrolyte solution for a secondary battery to a secondary battery as an electrolyte.

* * * * *